(12) United States Patent
Ma

(10) Patent No.: US 11,435,999 B2
(45) Date of Patent: Sep. 6, 2022

(54) METHOD AND APPARATUS FOR UPGRADING SOFTWARE

(71) Applicant: Hangzhou Hikvision Digital Technology Co., Ltd, Hangzhou (CN)

(72) Inventor: Jie Ma, Hangzhou (CN)

(73) Assignee: Hangzhou Hikvision Digital Technology Co., Ltd, Hangzhou (CN)

( * ) Notice: Subject to any disclaimer, the term of this patent is extended or adjusted under 35 U.S.C. 154(b) by 1142 days.

(21) Appl. No.: 15/778,452

(22) PCT Filed: Sep. 20, 2017

(86) PCT No.: PCT/CN2017/102401
§ 371 (c)(1),
(2) Date: May 23, 2018

(87) PCT Pub. No.: WO2018/113353
PCT Pub. Date: Jun. 28, 2018

(65) Prior Publication Data
US 2021/0200524 A1 Jul. 1, 2021

(30) Foreign Application Priority Data
Dec. 23, 2016 (CN) .......................... 201611205163.9

(51) Int. Cl.
*H04N 7/00* (2011.01)
*G06F 8/65* (2018.01)
(Continued)

(52) U.S. Cl.
CPC .............. *G06F 8/65* (2013.01); *H04L 1/1664* (2013.01); *H04N 7/0357* (2013.01)

(58) Field of Classification Search
CPC .... H04N 5/23225; H04N 7/18; H04N 7/0357; G06F 8/65; H04L 1/1664
See application file for complete search history.

(56) References Cited

U.S. PATENT DOCUMENTS 5,321,750 A * 6/1994 Nadan ................. H04L 12/1804
380/240
6,914,637 B1 * 7/2005 Wolf ...................... H04N 19/89
348/476
(Continued)

FOREIGN PATENT DOCUMENTS

CN 101557583 A 10/2009
CN 101621368 A 1/2010
(Continued)

*Primary Examiner* — Michael B. Pierorazio
(74) *Attorney, Agent, or Firm* — Clements Bernard Baratta; Lawrence A. Baratta, Jr.

(57) ABSTRACT

A method and apparatus for upgrading software in a front-end device connectable to a back-end device through a coaxial cable. The method includes receiving an instruction for a software upgrade, which is inserted into a horizontal blanking region of a video signal, from the back-end device through the coaxial cable, receiving, in sequence, data packets inserted into the horizontal blanking region, from the back-end device through the coaxial cable, the data packets including data for the software upgrade, and upgrading software in the front-end device based on the received data packets. Existing coaxial cables in a video surveillance system are used to transmit the data for the software upgrade, and during data transmission for the software upgrade the normal monitoring function of the video surveillance system is enabled.

12 Claims, 1 Drawing Sheet

Receiving an instruction for software upgrade, which is inserted into a horizontal blanking region of a video signal, from a back-end device through a coaxial cable — S101

Receiving, in sequence, data packets inserted into the horizontal blanking region, from the back-end device through the coaxial cable, wherein the data packets include data for software upgrade — S102

Upgrading the software of the front-end device based on the received data packets — S103

(51) Int. Cl.
*H04L 1/16* (2006.01)
*H04N 7/035* (2006.01)

(56) References Cited

U.S. PATENT DOCUMENTS

| | | | | |
|---|---|---|---|---|
| 7,131,004 | B1* | 10/2006 | Lyle | H04L 9/12 |
| | | | | 713/169 |
| 7,242,766 | B1* | 7/2007 | Lyle | H04L 9/3271 |
| | | | | 380/2 |
| 8,479,253 | B2* | 7/2013 | Glen | H04N 7/163 |
| | | | | 725/98 |
| 2002/0120885 | A1 | 8/2002 | Choi et al. | |
| 2005/0066356 | A1* | 3/2005 | Stone | H04N 21/4367 |
| | | | | 380/255 |
| 2007/0274348 | A1* | 11/2007 | Friedman | H04J 3/0697 |
| | | | | 370/503 |
| 2008/0180518 | A1* | 7/2008 | Miyazaki | H04N 21/4367 |
| | | | | 375/E7.025 |
| 2008/0307496 | A1* | 12/2008 | Kurose | H04N 21/43615 |
| | | | | 726/2 |
| 2009/0040287 | A1* | 2/2009 | Miyazaki | H04N 21/4367 |
| | | | | 348/14.01 |
| 2009/0153734 | A1* | 6/2009 | Glen | H04N 21/43615 |
| | | | | 348/E5.085 |
| 2009/0288116 | A1* | 11/2009 | Zalewski | H04N 5/50 |
| | | | | 725/38 |
| 2010/0037253 | A1* | 2/2010 | Sheehan | H04N 21/242 |
| | | | | 725/35 |
| 2013/0223336 | A1* | 8/2013 | Lindner | H04L 47/35 |
| | | | | 370/328 |

FOREIGN PATENT DOCUMENTS

| | | |
|---|---|---|
| CN | 101711026 A | 5/2010 |
| CN | 101807155 A | 8/2010 |
| CN | 103581710 A | 2/2014 |
| CN | 105704445 A | 6/2016 |
| CN | 105760203 A | 7/2016 |
| CN | 205510266 U | 8/2016 |
| CN | 106209322 A | 12/2016 |
| KR | 20080017181 A | 2/2008 |

* cited by examiner

METHOD AND APPARATUS FOR UPGRADING SOFTWARE

The present application claims the priority to a Chinese patent application No. 201611205163.9, filed with the State Intellectual Property Office of the People's Republic of China on Dec. 23, 2016 and entitled "METHOD AND APPARATUS FOR UPGRADING SOFTWARE", which is incorporated herein by reference in its entirety.

TECHNICAL FIELD

The application relates to the field of video monitoring technology, and in particular to a method and apparatus for upgrading software.

BACKGROUND

With the development of the security technology, video surveillance systems are more and more widely used. In general, a video surveillance system includes a back-end device and a front-end device. The back-end device is connectable to the front-end device through coaxial cables, and can be used to upgrade software in the front-end device such as an analog camera. In the prior art, for purpose of the software upgrade, the video surveillance system may require a cable to transmit the data for software upgrade and a switch control module that enables the video surveillance system to switch between two states, i.e., transmitting the data for software upgrade and outputting the video data.

As can be readily appreciated, in the prior art, although the software in the front-end device such as an analog camera can be upgraded, the cable for transmitting the data for software upgrade and the switch control module have to be additionally disposed in the video surveillance system. Therefore, the cost of the production of the video surveillance system is greatly increased. In addition, since the video surveillance system can be in only one of the two states at any time, the video signals cannot be output, and thus the entire video surveillance system is unavailable for surveillance, during the transmission of the data for software upgrade. Therefore, there are the problems of how to implement the upgrading of the software in the front-end device, and how to enable the normal monitoring function of the video surveillance system during the transmission of the data for software upgrade, in the premise of the maximum reduction in the cost of the production of the video surveillance system.

SUMMARY

The objective of embodiments of the present application is to provide a method and apparatus for upgrading software, so that the upgrading of the software in the front-end device is implemented, and the normal monitoring function of the video surveillance system during the upgrading of the software in the front-end device is enabled, in the premise of the maximum reduction in the cost of the production of the video surveillance system.

Embodiments of the present application provide a method for upgrading software, which is appliable to a front-end device connectable to a back-end device through a coaxial cable, including:

receiving an instruction for software upgrade, which is inserted into a horizontal blanking region of a video signal, from the back-end device through the coaxial cable;

receiving, in sequence, data packets inserted into the horizontal blanking region, from the back-end device through the coaxial cable, wherein the data packets comprise data for software upgrade; and upgrading software in the front-end device based on the received data packets.

Embodiments of the present application provide an apparatus for upgrading software which is appliable to a front-end device connectable to a back-end device through a coaxial cable. The apparatus includes:

an software upgrade instruction receiving module, configured to receive an instruction for software upgrade, which is inserted into a horizontal blanking region of a video signal, from the back-end device through the coaxial cable;

a data packet receiving module, configured to receive, in sequence, data packets inserted into the horizontal blanking region, from the back-end device through the coaxial cable, wherein the data packets comprise data for software upgrade; and an upgrading module, configured to upgrade software in the front-end device based on the received data packets.

Embodiments of the present application provide a storage medium, configured to store executable program codes, which, when executed, performs the method for upgrading software described above.

Embodiments of the present application provide an application program, configured to perform the method for upgrading software described above when being executed.

Embodiments of the present application provide a front-end device connectable to a back-end device through a coaxial cable, including a processor, a memory, a communication interface, and a bus, wherein, the processor, the memory, and the communication bus are communicatively connected with each other by the bus;

the memory is configured to store executable program codes;

the processor is configured to execute a program corresponding to the executable program codes by reading the executable program codes stored in the memory, in order to perform the following operations:

receiving an instruction for software upgrade, which is inserted into a horizontal blanking region of a video signal, from the back-end device through the coaxial cable;

receiving, in sequence, data packets inserted into the horizontal blanking region, from the back-end device through the coaxial cable, wherein the data packets comprise data for software upgrade; and upgrading software in the front-end device based on the received data packets.

Embodiments of the present application provide a method and apparatus for upgrading software. The method is used in a front-end device connectable to a back-end device through a coaxial cable. The method includes: receiving an instruction for software upgrade, which is inserted into a horizontal blanking region of a video signal, from the back-end device through the coaxial cable; receiving, in sequence, data packets inserted into the horizontal blanking region, from the back-end device through the coaxial cable, wherein the data packets comprise data for software upgrade; and upgrading software in the front-end device based on the received data packets. Compared to the prior art, in this embodiment of the present application, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cable, the normal monitoring function of the video surveillance system is enabled.

BRIEF DESCRIPTION OF THE DRAWINGS

To describe the technical solutions of embodiments of the application and the prior art more clearly, the accompanying drawings used in the description of the embodiments and the prior art are described briefly below. Obviously, the accompanying drawings described below merely reflect some embodiments of the application, based on which those skilled in the art can obtain other drawings without creative efforts.

DETAILED DESCRIPTION

The technical solutions in the embodiments of the present application are described clearly and completely below with reference to the drawings. Obviously, the described embodiments are only some, and not all, of the embodiments of the present application. All other embodiments obtained based on the embodiments of the present application by those skilled in the art without any creative efforts fall into the scope of protection defined by the present application.

In order to solve the problem in the prior art, a method and apparatus for upgrading software are provided in embodiments of the present application.

A method for upgrading software according to an embodiment of the present invention is first illustrated below.

It is noted that the method for upgrading software provided by the embodiment of the present application is used in a front-end device connectable to a back-end device through a coaxial cable.

Those skilled in the art may appreciate that a coaxial cable may be used to transmit two types of signals, i.e., a video signal and a control signal. The video signal can be transmitted from the front-end device to the back-end device through the coaxial cable. The control signal can be inserted, as an insertion code signal, into a horizontal blanking region of a video signal, so that it can be transmitted, through the coaxial cable, from the back-end device to the front-end device, or from the front-end device to the back-end device.

In this embodiment, the back-end device may be a DVR (Digital Video Recorder), and the front-end device may be an analog camera. Of course, the types of the back-end device and the front-end device are not limited to these, and may be specifically determined according to actual conditions. The embodiment is not limited in this regard.

It is noted that, the DVR is a set of computer systems capable of storing and processing image, and these computer systems have a function for recording images/sounds for a long time, a function of remote monitoring and surveillance, and so on.

Figure 1:
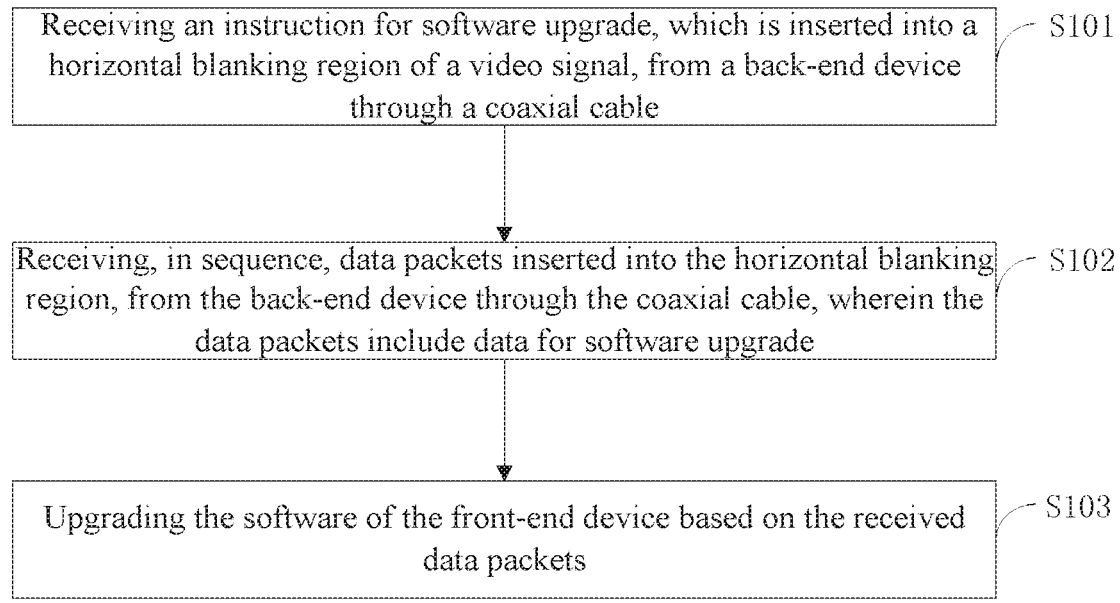
FIG. 1 is a flowchart of a method for upgrading software provided in an embodiment of the present application.

Referring to FIG. 1, a flowchart of a method for upgrading software according to an embodiment of the present application is illustrated. As shown in FIG. 1, the method includes S101-S103.

S101, Receiving an instruction for software upgrade, which is inserted into a horizontal blanking region of a video signal, from a back-end device through a coaxial cable.

It is appreciated that, the operation of inserting the instruction for software upgrade into the horizontal blanking region of the video signal may be performed by the back-end device or other electronic devices. These are feasible. For ease of illustration, the following embodiments are described by taking the case where the operation of inserting various data into the horizontal blanking region of the video signal is performed by the back-end device, as an example.

It is noted that the principle behind the insertion of the instruction for software upgrade into the horizontal blanking region of the video signal is similar to that behind the insertion of the control signal into the video signal. This is thus not repeatedly described here.

In addition, in order to quickly identify the instruction for software upgrade by the front-end device, a protocol header 0 (which may be used to identify the instruction for software upgrade) may also be inserted, as an insertion code signal, into the horizontal blanking region of the video signal while the instruction for software upgrade is inserted, as an insertion code signal, into the horizontal blanking region of the video signal. In this way, the front-end device may receive the protocol header 0 when receiving the instruction for software upgrade. According to the protocol header 0, the front-end device may determine that the signal currently received is the instruction for software upgrade. After receiving the instruction for software upgrade, the front-end device may prepare to receive the data for software upgrade.

S102, Receiving, in sequence, data packets inserted into the horizontal blanking region, from the back-end device through the coaxial cable, wherein the data packets include data for software upgrade.

Those skilled in the art may appreciate that only a small number of bytes of insertion code signal can be inserted into the horizontal blanking region of the video signal, and the complete data for software upgrade corresponding to the front-end device typically has a larger number of bytes. Thus, multiple transmissions may be required for the complete software upgrade data. Specifically, after obtaining the complete data for software upgrade for the front-end device, the back-end device may extract some bytes of data for software upgrade each time and insert the some bytes of data for software upgrade into the horizontal blanking region as an insertion code signal. In order to quickly identify the data for software upgrade by the front-end device, the back-end device may insert a protocol header 2, as an insertion code signal, into the horizontal blanking region of the video signal when inserting the some bytes of data for software upgrade, as an insertion code signal, into the horizontal blanking region of the video signal, such that the data packet consisted of the some bytes of data for software upgrade and the protocol header 2 can be transmitted to the front-end device through the coaxial cable.

It is noted that, the principle behind the insertion of multiple data packets into the horizontal blanking region of the video signal is similar to that behind the insertion of the control signal into the horizontal blanking region of the video signal. Thus, it is not repeatedly described here.

S103, Upgrading the software in the front-end device based on the received data packets.

It is noted that, the implementation of upgrading the software in the front-end device by the front-end device based on the received data packets is well known to those skilled in the art. Thus, it is not repeatedly described here.

In this embodiment, the back-end device may insert the complete data for software upgrade required for upgrading the front-end device into the horizontal blanking region of the video signal in sequence, and then transmit the data for software upgrade inserted into the horizontal blanking region to the front-end device through the coaxial cable in sequence. That is to say, the data for software upgrade is transmitted through the coaxial cable. Finally, after receiving the complete data for software upgrade through the coaxial cable, the front-end device may upgrade the software therein based on the complete data for software upgrade received.

Compared to the prior art, in this embodiment, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cable, the normal monitoring function of the video surveillance system is enabled.

In a specific implementation of the embodiment of the present application, each of the data packets further includes a data packet number determined based on a preset numbering rule, and is inserted into the horizontal blanking region in sequence according to the data packet number. Further, the data for software upgrade in the data packet is inserted into the designated area in the horizontal blanking region. The method may further include:

determining, after receiving each data packet, whether the data packet number in the received data packet satisfies a first given condition based on the preset numbering rule;

if the data packet number satisfies the first given condition, extracting the data for software upgrade in the received data packet from the designated area and writing the extracted data for software upgrade into the designated location in the front-end device based on the data packet number in the data packet;

if the data packet number does not satisfy the first given condition, deleting the received data packet and sending to the back-end device a first error message containing the data packet number of the data packet to be retransmitted, so that the back-end device inserts the data packet to be retransmitted into the horizontal blanking region after receiving the first error message, so as to transmit the data packet to be retransmitted to the front-end device through the coaxial cable.

Accordingly, upgrading the software in the front-end device based on the received data packets includes:

upgrading the software in the front-end device based on the data for software upgrade in the designated location in the front-end device.

Each time when extracting some bytes of data for software upgrade from the complete data for software upgrade, the back-end device may determine a data packet number for the extracted some bytes of data for software upgrade based on the preset numbering rule, and insert the extracted some bytes of data for software upgrade, along with the determined data packet number, into the horizontal blanking region, so as to transmit a data packet consisted of the extracted some bytes of data for software upgrade and the determined data packet number to the front-end device through the coaxial table.

It is noted that, to ensure that the front-end device can quickly identify the data packet, the back-end device may insert the protocol header 2 into the horizontal blanking region each time when inserting the extracted some bytes of data for software upgrade and the determined data packet number into the horizontal blanking region. As such, when receiving one data packet, the front-end device can determine that the data packet contains the data for software upgrade as long as the data packet contains the protocol header 2.

It should be noted that multiple different preset numbering rules and first given conditions may be possible. The following examples will be introduced.

In a specific implementation of this embodiment, the back-end device may determine a data packet number 1 for the data for software upgrade extracted for the first time, a data packet number 2 for the data for software upgrade extracted for the second time, a data packet number 3 for the data for software upgrade extracted for the third time, . . . , a data packet number n for the data for software upgrade extracted for the nth time.

In this implementation, in actually transmitting the data packets, the back-end device may first insert the data packet with the data packet number 1 into the horizontal blanking region and transmit it to the front-end device through the coaxial cable, then insert the data packet with the data packet number 2 into the horizontal blanking region and transmit it to the front-end device through the coaxial cable, then insert the data packet with the data packet number 3 into the horizontal blanking region and transmit it to the front-end device through the coaxial cable, and so on. The detailed description here is omitted.

It can be easily seen that, in this implementation, the first given condition may be that, the data packet number of the data packet received for the first time is 1, and the data packet number of any subsequently received data packet is increased by 1 with respect to that of the previous one.

In another specific implementation of the embodiment of the present application, the back-end device may determine a data packet number 2 for the data for software upgrade extracted for the first time, and a data packet number 4 for the data for software upgrade extracted for the second time, a data packet number 6 for the data for software upgrade extracted for the third time, . . . , a data packet number 2n for the data for software upgrade extracted for the nth time.

In this implementation, in actually transmitting the data packets, the back-end device may first insert the data packet with the data packet number 2 into the horizontal blanking region and transmit it to the front-end device through the coaxial cable, then insert the data packet with the data packet number 4 into the horizontal blanking region and transmit it to the front-end device through the coaxial cable, then insert the data packet with the data packet number 6 into the horizontal blanking region and transmit it to the front-end device through the coaxial cable, and so on. The detained description here is omitted.

It can be easily seen that, in this implementation, the first given condition may be that, the data packet number of the data packet received for the first time is 2, and the data packet number of any subsequently received data packet is increased by 2 with respect to that of the previous one.

After receiving any data packet, the front-end device may determine whether the data packet number in the received data packet satisfies the first given condition.

If the front-end device determines that the data packet number in the data packet received satisfies the first given condition, it is indicated that the data packet received by the front-end device is correct. In this case, the front-end device may extract the data for software upgrade in the data packet from the designated area in the horizontal blanking region and store the extracted data for software upgrade in the designated location in the front-end device, such as the memory of front-end device, so that these data for software upgrade may be used in subsequent steps.

If the front-end device determines that the data packet number in the data packet received does not satisfy the first given condition, it is indicated that the data packet received by the front-end device is incorrect. In this case, the front-end device may send a first error message to the back-end device, so that the back-end device can perform the corresponding operation after receiving the first error message.

The processing flow in the case where the data packet number in the data packet received does not satisfy the first given condition is described below with reference to a specific example.

Assume that the first of the two preset numbering rules described in the above embodiments is employed, the data packet received by the front-end device last time has the data packet number 1, and the data packet currently received by the front-end device has the data packet number 3. It is appreciated that the front-end device should have received, after receiving the data packet with the data packet number 1, a data packet with the data packet number 2 rather than the data packet with the data packet number 3, and the reception of the data packet with the data packet number 3 indicates that the data packet with the data packet number 2 is lost. To ensure that the front-end device can obtain the complete data for software upgrade in sequence, the front-end device may delete the data packet with the data packet number 3 and send, to the back-end device, a first error message containing the data packet number of the data packet to be retransmitted (i.e., the data packet number 2). In this way, after receiving the first error message, the back-end device inserts the data packet with the data packet number 2 into the horizontal blanking region of the video signal and transmits the data packet to the front-end device through the coaxial cable. Finally, the front-end device will receive the correct data packet.

In this embodiment, after receiving any data packet, the front-end device determines whether the data packet is correct by determining whether the data packet number in the data packet satisfies the first given condition. The front-end device will write the data for software upgrade in the data packet into the designated position of the front-end device only if the data packet is correct; otherwise, the front-end device will delete the data packet and send a first error message to the back-end device so that the back-end device retransmits the correct data packet. In this way, the front-end device can write the complete data for software upgrade to the designated location in the front-end device in sequence. Finally, the complete data for software upgrade will exist in the designated location in the front-end device. On the basis of the data, the front-end device can successfully upgrade the software therein.

It can be easily seen that in this embodiment, the front-end device can successfully upgrade the software therein.

In one implementation of this embodiment of the present application, the data packets may be pre-divided into at least one group. Each group has a group number determined based on a preset grouping rule. Each data packet contains a data packet number, which is determined based on the preset numbering rule, in the group that the data packet belongs to. Each group is inserted into the horizontal blanking region in sequence according to the group number. The method may further include:

receiving, before receiving data packets in one group through the coaxial cable, the group number of the group through the coaxial cable;

determining whether the group number received satisfies a second given condition based on the preset grouping rule;

if the group number received does not satisfy the second given condition, sending to the back-end device a second error message containing the group number to be retransmitted, so that the back-end device may insert the group number to be retransmitted into the horizontal blanking region after receiving the second error message, so as to transmit the group number to be retransmitted to the front-end device through the coaxial cable.

It is noted that, to ensure that the front-end device can distinguish a group number from a data packet, the back-end device may insert a protocol header 1 into the horizontal blanking region of the video signal when inserting the group number into the horizontal blanking region. As such, after receiving one data packet, the front-end device only needs to check whether the protocol header 1 or the protocol header 2 is contained in the received data packet. In particular, the front-end device may determine that the data packet contains the group number if the protocol header 1 is contained in the data packet; and the front-end device may determine that the data packet contains the data packet if the protocol header 2 is contained in the data packet.

In this embodiment, the back-end device may pre-divide the plurality of data packets into at least one group, wherein each group has a group number determined based on the preset grouping rule, and each data packet contains a data packet number, which is determined based on the preset numbering rule, in the group that the data packet belongs to. For any data packet, the group number of the group that the data packet belongs to can be used as the absolute packet number of the data packet, and the data packet number of the data packet in the group that the data packet belongs to can be used as the relative packet number of the data packet. The absolute packet number and the relative packet number can be used in combination to effectively identify the data packet.

This embodiment will be described below with reference to a specific example.

Assume that a plurality of data packets are divided into five groups, group numbers corresponding to the five groups are the group number 1, the group number 2, the group number 3, the group number 4, and the group number 5 respectively, and each group includes 50 data packets with data packet numbers from 1 to 50. The back-end device may first insert the group number 1 along with the protocol header 1, as an insertion code signal, into the horizontal blanking region, and then transmit the group number 1 and the protocol header 1 inserted into the horizontal blanking region to the front-end device through the coaxial cable. Subsequently, the back-end device may insert the 50 data packets in the group with the group number 1 into the horizontal blanking region in sequence and transmit the data packets to the front-end device in sequence through the coaxial cable. Next, the back-end device may insert the group number 2 along with the protocol header 2, as an insertion code signal, into the horizontal blanking region, and then transmit the group number 2 and the protocol header 2 inserted into the horizontal blanking region to the front-end device through the coaxial cable. Subsequently, the back-end device may insert the 50 data packets in the group with the group number 2 into the horizontal blanking region in sequence and transmit the data packets to the front-end device in sequence through the coaxial cable. The rest may be deduced by analogy, and the detailed description here is omitted. As can be easily appreciated, the front-end device will receive in sequence the group number 1, the group number 2, the group number 3, the group number 4, and the group number 5 in ideal conditions (when no error occurs in the transmission of the group numbers). Accordingly, the second given condition may be specifically as follows: the group number received for the first time is 1, and each group number subsequently received is increased by 1 with respect to the previous group number.

After receiving one group number, the front-end device may determine whether the group number received satisfies the second given condition.

If the front-end device determines that the group number received satisfies the second given condition, it is indicated that the group number received by the front-end device is correct.

If the front-end device determines that the group number received does not satisfy the second given condition, it is indicated that the group number received by the front-end device is incorrect. In this case, the front-end device may send the second error message to the back-end device, so that the back-end device can perform the corresponding operation after receiving the second error message.

A processing flow in the case where the group number received does not satisfy the second given condition is described below with reference to a specific example.

Assume that the group number received by the front-end device last time is 1, and the group number currently received by the front-end device is 3. It is appreciated that the front-end device should have received, after receiving the group number 1, the group number 2 rather than the group number 3, thus the reception of the group number 3 indicates that the group number 2 is lost. In this case, the front-end device will receive 50 data packets in the group with the group number 3, rather than 50 data packets in the group with the group number 2. Without remedial measures, the 50 data packets in the group with the group number 2 will not exist in the designated location in the front-end device, and thus the front-end device cannot obtain the complete data for software upgrade. Therefore, in this embodiment, the front-end device may send a second error message containing the group number 2 to the back-end device when the group number currently received by the front-end device is 3. As such, after receiving the second error message, the back-end device may insert the group number 2 into the horizontal blanking region and transmit it to the front-end device through the coaxial cable. In this way, the front-end device will receive the correct group number. Next, the front-end device will further receive the 50 packets in the group with the group number 2 in sequence.

In general, only a small number of bytes (e.g., 8 bytes) of insertion code signal can be inserted into the horizontal blanking region of the video signal each time. However, the complete data for software upgrade may contain a large number of bytes. Accordingly, a large number of data packets exist. If the data packets are directly numbered in sequence without being grouped, for data packets having a large data packet number, fewer bytes that are available for the insertion of the data for software upgrade will be left in the horizontal blanking region after the insertion of the data packet numbers thereof as insertion code signals. As a result, the efficiency of the transmission of the data for software upgrade will be very low. In this embodiment, however, the back-end device will transmit the group number of each group before transmitting the data packets in the group. In this way, the complete data for software upgrade needs not to be numbered in sequence, as long as the data packets in each group are numbered in sequence. As such, a data packet number in any data packet will not occupy a large number of bytes, and more bytes in each data packet can be available for the insertion of the data for software upgrade. Accordingly, the transmission rate of the data for software upgrade will be greatly improved.

It can be seen that, this embodiment not only ensures that the front-end device can obtain the complete data for software upgrade, but also effectively ensures the transmission rate of the data for software upgrade.

In a specific implementation of the embodiment of the present application, the instruction for software upgrade includes the maximum group number of the group numbers, and the maximum number of data packet numbers of data packets in the group with the maximum group number.

Accordingly, upgrading the software in the front-end device based on the data for software upgrade in the designated location in the front-end device may include:

upgrading the software in the front-end device based on the data for software upgrade in the designated location in the front-end device after receiving the data packet with the maximum data packet number in the group with the maximum group number.

Assume that the maximum group number of the group numbers is 5, and the maximum number of the data packet numbers of the data packets in the group with the maximum group number 5 is 50. In this way, when receiving a group number, the front-end device may determine whether the received group number is 5. After receiving the group number 5, the front-end device will receive each data packet in the group with the group number 5 in sequence. In this way, after receiving one data packet, the front-end device may determine whether the data packet number of the received data packet is 50. If so, it is indicated that the front-end device has obtained the complete data for software upgrade required for software upgrade. The front-end device may then upgrade the software therein based on these data. If not, it is indicated that the data for software upgrade in the front-end device is not yet complete, and the front-end device needs to continue to receive data packets.

It can be easily seen that, in this embodiment, the front-end device may conveniently and quickly determine whether it has received the complete data for software upgrade.

Optionally, each data packet may further includes first check data that is obtained by performing, in advance, a first preset check operation on the data for software upgrade in this data packet. The first preset check operation may be a sum operation or an algorithm for obtaining an MD5 value. They are feasible. Algorithms for the first preset check operation are not limited in this embodiment.

Accordingly, the method may also include:

after receiving one data packet, performing the first preset check operation on the data for software upgrade in the received data packet to obtain a first operation result;

determining whether the first operation result is identical to the first check data in the received data packet;

if the first operation result is not identical to the first check data, after predetermined data has been received completely, deleting the predetermined data and sending to the back-end device a third error message containing a target group number, so that the back-end device inserts all the data packets in the group with the target group number into the horizontal blanking region in sequence after receiving the third error message, so as to transmit all the data packets in the group with the target group number to the front-end device through the coaxial cable in sequence, wherein, the target group number is the group number of the group that the currently received data packet belongs to, and the predetermined data is the data in all the data packets in the group with the target group number.

In this embodiment, after receiving each data packet, the front-end device may perform the first preset check operation on the data for software upgrade in the received data packet to obtain the first operation result, and determine whether the first operation result is identical to the first check data in the received data packet.

It is appreciated that, if the first operation result is identical to the first check data, it is indicated that no error occurs during the transmission of the received data packet. In this case, the front-end device can directly extract the data for software upgrade in the data packet from the designated area in the horizontal blanking region, and store the data for software upgrade in the designated location in the front-end device, so as to use the data in the designated location in subsequent steps. If the first operation result is not identical to the first check data, it is indicated that an error occurs during the transmission of the received data packet. In this case, the front-end device may wait until it completely receives the data packets in the group that the received data packet belongs to (i.e., the group with the target group number). The front-end device may, after determining that the reception of all the data packets in the group with the target group number is complete, delete the predetermined data (i.e., the data in all the data packets in the group with the target group number), and send to the back-end device the third error message containing the target group number, so that the back-end device may retransmit all the data packets in the group with the target group number after receiving the third error message. In this way, the front-end device can eventually receive predetermined data, with no error occurring during the transmission of the predetermined data.

It can be seen that, in this embodiment, the accuracy of the data for software upgrade obtained by the front-end device can be ensured, therefore the successful upgrade of the front-end device can be achieved.

In a specific implementation of an embodiment of the present application, the instruction for software upgrade may include a first type of information about a front-end device to which a plurality of data packets are applicable. Accordingly, after obtaining the instruction for software upgrade, which is inserted into the horizontal blanking region of the video signal, from the back-end device through the coaxial cable, the method may further include:

determining whether the first type of information is identical to a second type of information of the front-end device;

if the first type of information is identical to the second type of information, sending a first acknowledgement message to the back-end device, so that the back-end device inserts the data packets into the horizontal blanking region and transmits the data packets to the front-end device in sequence through the coaxial cable, after receiving the first acknowledgement message.

In this embodiment, if the front-end device determines that the first type of information is identical to the second type of information, it is indicated that the plurality of data packets to be transmitted from the back-end device to the front-end device through the coaxial cable match with the front-end device. In this case, the front-end device may send the first acknowledgement message to the back-end device, so that the back-end device starts to transmit each of the data packets after receiving the first acknowledgement message, so as to ensure that the front-end device can be upgraded based on these data. If the front-end device determines that the first type of information is not identical to the second type of information, it is indicated that the plurality of data packets to be transmitted from the back-end device to the front-end device through the coaxial cable cannot match with the front-end device, and thus the front-end device cannot be upgraded based on these data. In this case, the front-end device may send a fourth error message to the back-end device. As such, the back-end device will not send data packets to the front-end device after receiving the fourth error message. Accordingly, system resources in the back-end device can be effectively saved.

It is noted that, in addition to various information mentioned above, the instruction for software upgrade may also include the total number of bytes included in the complete data for software upgrade, the number of channels to be upgraded, and the like. These are feasible.

As can be seen, the embodiment can ensure that the front-end device receives data packets matching with the type of the front-end device, so that the successful upgrade of the front-end device can be ensured. Meanwhile, this embodiment may also effectively save the system resources in the back-end device.

In a specific implementation of the embodiment of the present application, sending a first acknowledgement message to the back-end device may include:

sending the first acknowledgement message to the back-end device and placing the front-end device in an upgrade flag state;

before upgrading the software in the front-end device based on the data packets received, the method may further include:

stopping receiving data packets from the back-end device through the coaxial cable if it is detected that the front-end device is not in the upgrade flag state.

In this embodiment, when determining that the first type of information is identical to the second type of information, the front-end device may send the first acknowledgement message to the back-end device so that the back-end device starts to transmit the data packets. Simultaneously, the front-end device may also place itself in the upgrade flag state so as to be prepared for the upgrade. The front-end device will be retained in the upgrade flag state until the software therein is upgraded successfully. If the front-end device detects that it is not in the upgrade flag state before upgrading the software, it is indicated that an unpredictable error occurs during the operation of the front-end device. In this case, the front-end device cannot respond to the instruction for software upgrade transmitted by the back-end device. Even if the front-end device has obtained the complete data for software upgrade, it cannot successfully upgrade the software therein. Therefore, the front-end device will stop receiving data packets from the back-end device through the coaxial cable when detecting that it is not in the upgrade flag state.

In a specific implementation of an embodiment of the present application, the instruction for software upgrade may include the second check data that is obtained by performing, in advance, a second preset check operation on the data for software upgrade in all the data packets. The second preset check operation may be the sum operation or the algorithm for obtaining an MD5 value. These are feasible. Algorithms for the second preset check operation are not limited in this embodiment.

Accordingly, before upgrading the software in the front-end device based on the data packets received, the method may further include:

performing the second preset check operation on the data for software upgrade in all the received data packets to obtain a second operation result;

determining whether the second operation result is identical to the second check data;

if the second operation result is identical to the second check data, upgrading the software in the front-end device based on the data packets received, and sending to the back-end device a second acknowledgement message indicative of the correct reception of the data packets.

It is appreciated that if the second operation result is identical to the second check data, it is indicated that the data packets received by the front-end device are correct and no error occurs during the transmission thereof. In this case, the front-end device may successfully upgrade the software therein based on these data packets. In addition, the front-end device may also send to the back-end device the second acknowledgement message indicative of the correct reception of the data packets, so as to avoid that the back-end device continues to transmit other messages to the front-end device after all the data for software upgrade have been transmitted.

It can be seen that, in this embodiment, the accuracy of the data for software upgrade received by the front-end device can be ensured, and thus the successful upgrade of the front-end device can be ensured.

In a specific implementation of the embodiment of the present application, before upgrading the software in the front-end device based on the data packets received, the method may further include:

determining whether the total size of all the received data packets is less than the memory size of the front-end device;

if the total size is less than the memory size, upgrading the software in the front-end device based on the data packets received;

if the total size is not less than the memory size, deleting the received data packets.

It is appreciated that the total size of the complete data for software upgrade for the front-end device must be less than the memory size of the front-end device. Therefore, after receiving the complete data for software upgrade, the front-end device will upgrade the software therein based on these data only when the total size of the received data packets is less than the memory size of the front-end device. If the total size of the received data packets is not less than the memory size of the front-end device, it is indicated that the complete data for software upgrade is incompatible with the front-end device. In this case, the front-end device cannot upgrade the software therein based on these data packets, and the front-end device may directly delete the received data packets.

It can be seen that this embodiment can reliably ensure the accuracy of the data for software upgrade based on which the front-end device is upgraded.

In view of above, in the premise of the maximum reduction in the cost of the production of the video surveillance system, the upgrading of the software in the front-end device is implemented, and the normal monitoring function of the video surveillance system during the upgrading of the software in the front-end device is enabled.

An apparatus for upgrading software provided in an embodiment of the present application will be described below.

Figure 2:
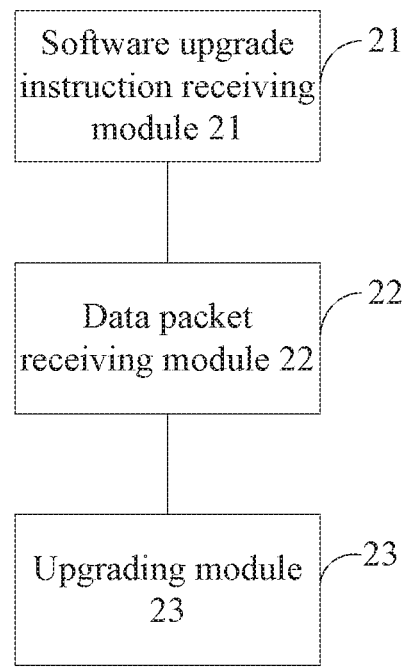
FIG. 2 is a block diagram illustrating the structure of an apparatus for upgrading software provided in an embodiment of the present application.

FIG. 2 shows the block diagram of the structure of the apparatus for upgrading software provided in an embodiment of the present application. As shown in FIG. 2, the apparatus is used in a front-end device connectable to a back-end device through a coaxial cable. The apparatus may include:

a software upgrade instruction receiving module 21, configured to receive an instruction for software upgrade, which is inserted into a horizontal blanking region of a video signal, from the back-end device through the coaxial cable;

a data packet receiving module 22, configured to receive, in sequence, a plurality of data packets inserted into the horizontal blanking region, from the back-end device through the coaxial cable, wherein the data packets include data for software upgrade; and an upgrading module 23, configured to upgrade the software in the front-end device based on the data packets received.

Compared to the prior art, in this embodiment, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cables, the normal monitoring function of the video surveillance system is enabled.

In a specific implementation of the embodiment of the present application, each of the data packets further includes a data packet number determined based on a preset numbering rule, and is inserted into the horizontal blanking region in sequence according to the data packet number; and the data for software upgrade in the data packet is inserted into a designated area in the horizontal blanking region;

the apparatus further includes:

a first determining module, configured to determine, after receiving each data packet, whether the data packet number in the received data packet satisfies a first given condition based on the preset numbering rule;

a first processing module, configured to, when the first determining module determines that the data packet number in the received data packet satisfies the first given condition, extract the data for software upgrade in the received data packet from the designated area and write the extracted data for software upgrade into a designated location in the front-end device based on the data packet number of the data packet; and a second processing module, configured to, when the first determining module determines that the data packet number in the received data packet does not satisfy the first given condition, delete the received data packet and send to the back-end device a first error message containing the data packet number of the data packet to be retransmitted, so that the back-end device inserts the data packet to be retransmitted into the horizontal blanking region after receiving the first error message, so as to transmit the data packet to be retransmitted to the front-end device through the coaxial cable.

The upgrading module is further configured to upgrade the software in the front-end device based on the data for software upgrade in the designated location.

In a specific implementation of the embodiment of the present application, the data packets are pre-divided into at least one group. Each group has a group number determined based on a preset grouping rule. Each data packet contains a data packet number, which is determined based on the preset numbering rule, in the group that the data packet belongs to. Each group is inserted into the horizontal blanking region in sequence according to the group number. The apparatus further includes:

a group number receiving module, configured to receive the group number of the group through the coaxial cable, before receiving data packets in one group through the coaxial cable;

a second determining module, configured to determine whether the received group number satisfies a second given condition based on the preset grouping rule; and a third processing module, configured to send, when the second determining module determines that the received group number does not satisfy the second given condition, to the back-end device a second error message containing the group number to be retransmitted, so that the back-end device inserts the group number to be retransmitted into the horizontal blanking region after receiving the second error message, so as to transmit the group number to be retransmitted to the front-end device through the coaxial cable.

In a specific implementation of the embodiment of the present application, the instruction for software upgrade includes a maximum group number of the group numbers and a maximum data packet number of data packet numbers of data packets in the group with the maximum group number.

The upgrading module is further configured to upgrade the software in the front-end device based on the data for software upgrade in the designated location in the front-end device after receiving the data packet with the maximum data packet number in the group with the maximum group number.

In a specific implementation of the embodiment of the present application, each data packet further includes first check data that is obtained by performing, in advance, a first preset check operation on the data for software upgrade in this data packet.

The apparatus further includes:

a first operation result obtaining module, configured to perform, after receiving one data packet, the first preset check operation on the data for software upgrade in the received data packet to obtain a first operation result;

a third determining module, configured to determine whether the first operation result is identical to the first check data in the received data packet; and a fourth processing module, configured to, when the third determining module determines that the first operation result is not identical to the first check data, delete predetermined data and send to the back-end device a third error message containing a target group number after the predetermined data has been completely received, so that the back-end device inserts all the data packets in the group with the target group number into the horizontal blanking region in sequence after receiving the third error message, so as to transmit all the data packets in the group with the target group number to the front-end device through the coaxial cable in sequence, wherein, the target group number is the group number of the group that the received data packet belongs to, and the predetermined data is data in all the data packets in the group with the target group number.

In a specific implementation of the embodiment of the present application, the instruction for software upgrade includes a first type of information about a front-end device to which the data packets are applicable.

The apparatus further includes:

a fourth determining module, configured to determine whether the first type of information is identical to a second type of information of the front-end device, after receiving the instruction for software upgrade, which is inserted into the horizontal blanking region of the video signal, from the back-end device through the coaxial cable; and a fifth processing module, configured to send, when the fourth determining module determines that the first type of information is identical to the second type of information, a first acknowledgement message to the back-end device, so that the back-end device inserts the data packets into the horizontal blanking region and transmits the data packets to the front-end device in sequence through the coaxial cable, after receiving the first acknowledgement message.

In a specific implementation of the embodiment of the present application, the fifth processing module is configured to send the first acknowledgement message to the back-end device and placing the front-end device in an upgrade flag state.

The apparatus further includes:

a sixth processing module, configured to stop receiving data packets from the back-end device through the coaxial cable when detecting that the front-end device is not in the upgrade flag state, before upgrading the software in the front-end device based on the received data packets.

In a specific implementation of the embodiment of the present application, the instruction for software upgrade includes second check data that is obtained by performing, in advance, a second preset check operation on the data for software upgrade in all the data packets.

The apparatus further includes:

a second operation result obtaining module, configured to perform, before upgrading the software in the front-end device based on the received data packets, the second preset check operation on the data for software upgrade in the received data packets to obtain a second operation result;

a fifth determining module, configured to determine whether the second operation result is identical to the second check data; and a seventh processing module, configured to, when the fifth determining module determines that the second operation result is identical to the second check data, trigger the upgrading module and send to the back-end device a second acknowledgement message indicative of the correct reception of the data packets.

In a specific implementation of the embodiment of the present application, the apparatus further includes:

a sixth determining module, configured to determine whether the total size of the received data packets is less than the memory size of the front-end device;

an eighth determining module, configured to trigger the upgrading module when the sixth determining module determines that the total size of the received data packets is less than the memory size; and a ninth processing module, configured to delete the received data packets when the sixth determining module determines that the total size of the received data packets is not less than the memory size.

In view of above, in the premise of the maximum reduction in the cost of the production of the video surveillance system, the upgrading of the software in the front-end device is implemented, and the normal monitoring function of the video surveillance system during the upgrading of the software in the front-end device is enabled.

A storage medium provided in an embodiment of the present application will be described below.

Embodiments of the present application provide a storage medium for storing executable program codes which, when executed, perform the method for upgrading software described above.

The specific implementation procedure of the storage medium may refer to the description of the method for upgrading software illustrated above, and is thus omitted herein.

Compared to the prior art, in this embodiment, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cables, the normal monitoring function of the video surveillance system is enabled.

An application program provided in an embodiment of the present application will be described below.

Embodiments of the present application provide an application program which, when executed, performs the method for upgrading software described above.

The specific implementation procedure of the application program may refer to the description of the method for upgrading software illustrated above, and is thus omitted herein.

Compared to the prior art, in this embodiment, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cables, the normal monitoring function of the video surveillance system is enabled.

A front-end device provided in an embodiment of the present application will be described below.

Embodiments of the present application provide a front-end device connectable to a back-end device through a coaxial cable, including a processor, a memory, a communication interface, and a bus, wherein, the processor, the memory, and the communication bus are communicatively connected with each other by the bus;

the memory stores executable program codes;

the processor executes a program corresponding to the executable program codes by reading the executable program codes stored in the memory, in order to perform the following operations:

receiving an instruction for software upgrade, which is inserted into a horizontal blanking region of a video signal, from the back-end device through the coaxial cable;

receiving, in sequence, data packets inserted into the horizontal blanking region, from the back-end device through the coaxial cable, wherein the data packets include data for software upgrade; and upgrading the software in the front-end device based on the received data packets.

The specific implementation procedure of the front-end device may refer to the description of the method for upgrading software illustrated above, and is thus omitted herein.

Compared to the prior art, in this embodiment, the existing coaxial cables in the video surveillance system are used to transmit the data for software upgrade, thus there is no need to add other cables for transmitting the data for software upgrade and a switch control module into the video surveillance system. Therefore, the hardware structure of the video surveillance system is not changed, and accordingly, the cost of the production of the video surveillance system is reduced. In addition, during the transmission of the data for software upgrade, as the video signal can be normally transmitted in the coaxial cables, the normal monitoring function of the video surveillance system is enabled.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, storage medium, application program and front-end device are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for upgrading software, which is applicable to a video surveillance system comprising a front-end device and a back-end device, wherein a video signal acquired by the front-end device is transmitted to the back-end device through a coaxial cable, comprising:

receiving an instruction for software upgrade of the front-end device, which is inserted into a horizontal blanking region of the video signal, from the back-end device through the coaxial cable, wherein the instruction for software upgrade includes a maximum data packet number of data packet numbers of data packets inserted into the horizontal blanking region of the video signal, and wherein the data packet numbers are determined based on a preset numbering rule, and the data packets are inserted into the horizontal blanking region of the video signal in sequence according to the data packet numbers;

receiving, in sequence, the data packets inserted into the horizontal blanking region of the video signal, from the back-end device through the coaxial cable, wherein the data packets comprise data for software upgrade, and the data packet numbers determined based on the preset numbering rule, and the data for software upgrade in each of the data packets is inserted into a designated area in the horizontal blanking region of the video signal; and after receiving a data packet having the maximum data packet number, upgrading software in the front-end device based on the received data packets.

2. The method of claim 1, wherein, the method further comprises:

determining, after receiving each of the data packets, whether a data packet number in the received data packet satisfies a first given condition based on the preset numbering rule;

if the data packet number in the received data packet satisfies the first given condition, extracting the data for software upgrade in the received data packet from the designated area and writing the extracted data for software upgrade into a designated location in the front-end device based on the data packet number in this data packet; and if the data packet number in the received data packet does not satisfy the first given condition, deleting the received data packet and sending to the back-end device a first error message containing a data packet number of a data packet to be transmitted which satisfies the first given condition, so that the back-end device inserts the data packet to be transmitted into the horizontal blanking region of the video signal after receiving the first error message, so as to transmit the data packet to be transmitted to the front-end device through the coaxial cable; and after receiving a data packet having the maximum data packet number, upgrading software in the front-end device based on the received data packets comprises:

after receiving the data packet having the maximum data packet number, upgrading the software in the front-end device based on the data for software upgrade in the designated location in the front-end device.

3. The method of claim 2, wherein, the data packets are pre-divided into at least one group; each group has a group number determined based on a preset grouping rule; each of the data packets has a data packet number, which is determined based on the preset numbering rule, in the group that this data packet belongs to; each group is inserted into the horizontal blanking region of the video signal in sequence according to the group number;

the instruction for software upgrade comprises a maximum group number of group numbers and a maximum data packet number of data packet numbers of data packets in a group with the maximum group number; and after receiving the data packet having the maximum data packet number, upgrading the software in the front-end device based on the data for software upgrade in the designated location in the front-end device comprises:

upgrading the software in the front-end device based on the data for software upgrade in the designated location in the front-end device, after receiving a data packet having the maximum data packet number in the group with the maximum group number.

4. The method of claim 3, wherein, the method further comprises:

before receiving each data packet in one group through the coaxial cable, receiving a group number of this group through the coaxial cable;

determining whether the received group number satisfies a second given condition based on the preset grouping rule; and if the received group number does not satisfy the second given condition, sending to the back-end device a second error message containing a group number to be transmitted which satisfies the second given condition, so that the back-end device, after receiving the second error message, inserts the group number to be transmitted into the horizontal blanking region of the video signal, so as to transmit the group number to be transmitted to the front-end device through the coaxial cable.

5. The method of claim 3, wherein, each of the data packets further comprises first check data that is obtained by performing, in advance, a first preset check operation on the data for software upgrade in this data packet; and the method further comprises:

after receiving one data packet, performing the first preset check operation on the data for software upgrade in the received data packet to obtain a first operation result;

determining whether the first operation result is identical to the first check data in the received data packet; and if the first operation result is not identical to the first check data, after predetermined data has been received completely, deleting the predetermined data and sending to the back-end device a third error message containing a target group number, so that the back-end device inserts all the data packets in a group with the target group number into the horizontal blanking region of the video signal in sequence after receiving the third error message, so as to transmit all the data packets in the group with the target group number to the front-end device through the coaxial cable in sequence, wherein, the target group number is the group number of the group that the received data packet belongs to, and the predetermined data is data in all the data packets in the group with the target group number.

6. The method of claim 1, wherein, the instruction for software upgrade comprises a first type of information about a front-end device to which the data packets are applicable; and after receiving an instruction for software upgrade, which is inserted into a horizontal blanking region of a video signal, from the back-end device through the coaxial cable, the method further comprises:

determining whether the first type of information is identical to a second type of information of the front-end device; and if the first type of information is identical to the second type of information, sending a first acknowledgement message to the back-end device, so that the back-end device inserts the data packets into the horizontal blanking region of the video signal and transmits the data packets to the front-end device in sequence through the coaxial cable, after receiving the first acknowledgement message.

7. The method of claim 6, wherein, sending a first acknowledgement message to the back-end device comprises:

sending the first acknowledgement message to the back-end device and placing the front- end device in an upgrade flag state; and before upgrading software in the front-end device based on the received data packets, the method further comprises:

stopping receiving data packets from the back-end device through the coaxial cable when detecting that the front-end device is not in the upgrade flag state.

8. The method of claim 1, wherein, the instruction for software upgrade comprises second check data that is obtained by performing, in advance, a second preset check operation on the data for software upgrade in all the data packets; and before upgrading software in the front-end device based on the received data packets, the method further comprises:

after receiving the data packet having the maximum data packet number, performing the second preset check operation on the data for software upgrade in the received data packets to obtain a second operation result;

determining whether the second operation result is identical to the second check data; and if the second operation result is identical to the second check data, performing the step of upgrading software in the front-end device based on the received data packets, and sending to the back-end device a second acknowledgement message indicative of correct reception of the data packets.

9. The method of claim 1, wherein, after receiving the data packet having the maximum data packet number, the method further comprises:

determining whether a total size of the received data packets is less than a memory size of the front-end device;

if the total size is less than the memory size, performing the step of upgrading software in the front-end device based on the received data packets; and if the total size is not less than the memory size, deleting the received data packets.

10. An apparatus for upgrading software, which is applicable to a video surveillance system comprising a front-end device and a back-end device, wherein a video signal acquired by the front-end device is transmitted to the back-end device through a coaxial cable, comprising:

an software upgrade instruction receiving module, configured to receive an instruction for software upgrade of the front-end device, which is inserted into a horizontal blanking region of the video signal, from the back-end device through the coaxial cable, wherein the instruction for software upgrade includes a maximum data packet number of data packet numbers of data packets inserted into the horizontal blanking region of the video signal, and wherein the data packet numbers are determined based on a preset numbering rule, and the data packets are inserted into the horizontal blanking region of the video signal in sequence according to the data packet numbers;

a data packet receiving module, configured to receive, in sequence, the data packets inserted into the horizontal blanking region of the video signal, from the back-end device through the coaxial cable, wherein the data packets comprise data for software upgrade, and the data packet numbers are determined based on a the preset numbering rule, and the data for software upgrade in each of the data packets is inserted into a designated area in the horizontal blanking region of the video signal; and an upgrading module, configured to upgrade software in the front-end device based on the received data packets, after receiving a data packet having the maximum data packet number.

11. A non-transitory storage medium configured to store executable program codes, which, when executed, performs the method for upgrading software according to claim 1.

12. A front-end device in a video surveillance system, wherein a video signal acquired by the front-end device is transmitted to a back-end device in the video surveillance system through a coaxial cable, comprising a processor, a memory, a communication interface, and a bus, wherein, the processor, the memory, and the communication bus are communicatively connected with each other by the bus;

the memory is configured to store executable program codes;

the processor is configured to execute a program corresponding to the executable program codes by reading the executable program codes stored in the memory, in order to perform the following operations:

receiving an instruction for software upgrade of the front-end device, which is inserted into a horizontal blanking region of the video signal, from the back-end device through the coaxial cable, wherein the instruction for software upgrade includes a maximum data packet number of data packet numbers of data packets inserted into the horizontal blanking region of the video signal, and wherein the data packet numbers are determined based on a preset numbering rule, and the data packets are inserted into the horizontal blanking region of the video signal in sequence according to the data packet numbers;

receiving, in sequence, the data packets inserted into the horizontal blanking region of the video signal, from the back-end device through the coaxial cable, wherein the data packets comprise data for software upgrade, and the data packet numbers determined based on the preset numbering rule, and the data for software upgrade in each of the data packets is inserted into a designated area in the horizontal blanking region of the video signal; and upgrading software in the front-end device based on the received data packets, after receiving a data packet having the maximum data packet number.

* * * * *